US006463033B1

(12) United States Patent
Harshavardhana

(10) Patent No.: US 6,463,033 B1
(45) Date of Patent: Oct. 8, 2002

(54) DUAL HUBBED TREE ARCHITECTURE FOR A COMMUNICATION NETWORK

(75) Inventor: Paramasiviah Harshavardhana, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/072,368

(22) Filed: May 4, 1998

(51) Int. Cl.[7] .............................. H04J 1/16; H04L 12/28
(52) U.S. Cl. ........................ 370/222; 370/256; 370/406; 370/408
(58) Field of Search .................................. 370/216–228, 370/256, 258, 406, 408, 452, 460, 400, 254, 255, 907, 222; 709/223, 224, 225, 226, 238, 239, 241, 252

(56) References Cited

U.S. PATENT DOCUMENTS

| | | | | |
|---|---|---|---|---|
| 4,947,390 A | * | 8/1990 | Sheehy ........................ 370/258 |
| 5,533,016 A | * | 7/1996 | Cook et al. .................. 370/256 |
| 5,923,646 A | * | 7/1999 | Mandhyan ................... 370/254 |
| 6,047,331 A | * | 4/2000 | Medard et al. .............. 709/239 |
| 6,061,335 A | * | 5/2000 | De Vito et al. ............. 370/256 |

OTHER PUBLICATIONS

B. Doshi et al, "Dual Ring Interworking: High Penalty Cases and How to Avoid Them," Proceedings of ITC 15, Jun., 1997.

Communications Network Analysis, Section 2–5, "The Esau–Williams Algorithm," pp. 14–20.

C. Buyukkoc, "Load Balancing on SONET Rings," Proceedings of ICT '96, Istanbul, pp. 763–766, 1996.

S. Cosares and I. Saniee, An Optimization Problem Related to Balancing Loads on SONET Rings, Telecommunication Systems, vol. 3, pp. 165–181, 1994.

* cited by examiner

*Primary Examiner*—Chau Nguyen
*Assistant Examiner*—Andrew Lee
(74) *Attorney, Agent, or Firm*—Ryan, Mason & Lewis, LLP

(57) ABSTRACT

Capacity demands are routed in an network including at least one ring having a pair of hub nodes and a number of additional nodes. A pair of routing trees is generated for the ring, with each of the routing trees specifying paths between nodes of the ring, and having as its root a corresponding one of the hub nodes of the ring. The routing trees are utilized to route capacity demands from nodes of the ring to other portions of the network, such as other rings. The routing trees for a given ring of the network are configured such that the two hub nodes of the ring are adjacent in each of the routing trees of that ring. In addition, the routing trees for the given ring are directed edge disjoint, such that if a link corresponding to one edge of a tree fails, an affected demand is routed to the other hub node of the ring using the other routing tree of the ring. The network may further include of pairs of "super" hub nodes, with pairs of the hub nodes of rings in the network each being assigned to pairs of the super hub nodes. A pair of routing trees generated for a given pair of the super hub nodes is then utilized to route demands for capacity from one of the hub nodes to one of the super hub nodes.

21 Claims, 6 Drawing Sheets

DUAL HUBBED TREE ARCHITECTURE FOR A COMMUNICATION NETWORK

FIELD OF THE INVENTION

The present invention relates generally to techniques for configuring optical networks and other types of communication networks, and more particularly to network configuration techniques which permit fast restoration of signal paths after a failure in a link or node of the network.

BACKGROUND OF THE INVENTION

Ring networks, such as networks based on synchronous optical network (SONET) rings, are becoming increasingly popular due to their fast restoration capability in the presence of node or link failures. A ring network may be viewed as any network which includes a set of interconnected rings of nodes. For a given network including a set of rings and a set of node-to-node traffic demands, the routing aspect of ring network design generally involves routing each demand across the ring network from its source node to its destination node such that the overall network cost, as a function of the ring capacities required by the routing, is minimized.

There are two types of ring interconnections that are used in ring networks: Single Ring Interworking (SRI) and Dual Ring Interworking (DRI). SRI is a simple interworking technique which uses only one hub node serving as a gateway to move traffic from one ring to another. The hub node has to be a common node shared by the two rings. SRI for a given demand is uniquely defined by two rings and a hub node for that demand. There may be multiple common nodes between two rings, and any one of the common nodes can be used in SRI. Although SRI has the advantage of simplicity, it provides no protection against hub node failure.

DRI is designed to overcome this reliability weakness at the price of higher complexity. In DRI, two hub nodes are selected from each ring and paired with the hub nodes on another ring. Cross-ring traffic is moved by sending two copies from one ring to the other via two hub pairs, with one copy sent on each hub pair. DRI is described in greater detail in, for example, B. Doshi et al, "Dual Ring Interworking: High Penalty Cases and How to Avoid Them," Proceedings of ITC 15, June, 1997. Examples of ring-based architectures which utilize DRI include bidirectional line-switched rings (BLSRI and path switched rings.

Although ring-based architectures based on DRI can provide very fast restoration, e.g., on the order of milliseconds, the increased restoration speed is achieved at the expense of added cost and increased operational complexity. Both the added cost and the increase in operational complexity can be traced to the above-described DRI feature. It is therefore apparent that a need exists for an improved network architecture which can provide the fast restoration capability commonly associated with DRI, but with a substantially reduced cost and complexity.

SUMMARY OF THE INVENTION

The invention provides techniques for routing capacity demands in a ring-based network while avoiding the cost and complexity typically associated with DRI. In an illustrative embodiment, a network includes at least one ring having a pair of hub nodes and a number of additional nodes. A pair of minimum-weight routing trees is generated for the ring, with each of the routing trees specifying paths between nodes of the ring, and having as its root a corresponding one of the hub nodes of the ring. The routing trees are utilized to route capacity demands from nodes of the ring to other portions of the network, such as other rings. The routing trees for a given ring of the network are configured such that the two hub nodes of the ring are adjacent in each of the routing trees of that ring. In addition, the routing trees for the given ring are directed edge disjoint, such that if a link corresponding to one edge of a tree fails, an affected demand is routed to the other hub node of the ring using the other routing tree of the ring. A capacity demand originating at one of the additional nodes of the ring is therefore routed through a first routing tree of the ring to a first hub node of the ring, while a restoration path for the given demand is provided through a second routing tree of the ring to a second hub node of the ring.

In accordance with another aspect of the invention, a network may be configured to include pairs of "super" hub nodes, with pairs of the hub nodes for rings in the network each being assigned to pairs of the super hub nodes. A pair of routing trees generated for a given pair of the super hub nodes is then utilized to route demands for capacity from one of the hub nodes to the super hub nodes. The routing trees for a given pair of super hub nodes have characteristics similar to those identified above for routing trees of ring hub nodes.

A dual hubbed tree network architecture in accordance with the invention not only provides the advantage of predefined failure-independent restoration paths, but also allows more efficient capacity sharing while eliminating the added cost and complexity associated with conventional DRI. These and other features and advantages of the present invention will become more apparent from the accompanying drawings and the following detailed description.

DETAILED DESCRIPTION OF THE INVENTION

The invention will be illustrated in conjunction with an exemplary optical network. It should be understood, however, that the invention is not limited to use with a particular type of network, but is instead more generally applicable to any network in which it is desirable to provide improved restoration with reduced complexity. For example, the techniques described herein may be utilized in telephone networks, cable networks, satellite networks and various combinations of these and other optical and electrical networks. The term "network" as used herein is therefore intended to include not only optical networks, but also electrical networks and hybrid optical-electrical networks. The term "ring" as used herein is intended to include any cluster or other arrangement of interconnected nodes which includes at least a basic ring interconnection between each of the nodes. A ring in accordance with the invention may therefore include additional interconnections between nodes beyond those required to support the basic ring interconnection. The term "central controller" refers generally to any type of processor which controls the routing of demands across multiple nodes of a network.

Figure 1A:
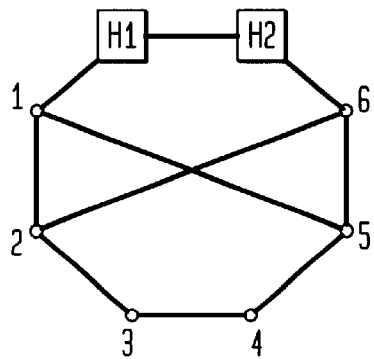
FIG. 1A shows a simple example of a dual hubbed tree (DHT) network architecture in accordance with the invention.

FIG. 1A shows an example illustrating a dual hubbed tree (DHT) network architecture in accordance with the invention. Through the use of dual routing trees, one with its root at a first hub node and the other with its root at a second hub node, this type of architecture can provide ring-like restoration speeds without the cost and complexity penalties typically associated with conventional ring architectures. As will be described in detail below, a DHT network architecture can provide predefined restoration paths as in a conventional ring architecture, but also allows more efficient capacity sharing while eliminating the need for conventional dual ring interworking (DRI).

The DHT network architecture example of FIG. 1A includes eight nodes 1, 2, ... 6, H1 and H2 with optical fiber links interconnecting these nodes as shown. The nodes as shown are arranged in a basic ring interconnection, but there are also additional node interconnections, i.e., links between nodes 1 and 5 and nodes 2 and 6. The H1 and H2 nodes are referred to herein as hub nodes. These hub nodes may be viewed as nodes which in a conventional ring-based network might otherwise act as interconnection points (e.g., DRI nodes) between a ring, e.g., made up nodes 1, 2, ... 6, H1 and H2, and another ring. Each of the nodes in FIG. 1A includes a corresponding nodal processor as will be described in conjunction with FIG. 2, and may represent a personal computer, a workstation, a microcomputer or other suitable digital data processor programmed to provide the path provisioning and restoration techniques described herein. The exemplary DHT architecture of FIG. 1A can be readily extended to complex applications, such as large-scale regional, national and international networks which may include many subnetworks each having hundreds of nodes. In an optical or electrical network for routing telephone calls, one or more of the subnetworks may be associated with each local exchange carrier (LEC) and inter-exchange carrier (IXC) of the network.

Unlike the above-noted bidirectional line-switched ring (BLSR) architecture and other conventional ring-based architectures, which generally provide failure-dependent restoration paths, the DHT architecture of the present invention can provide failure-independent restoration paths. The restoration paths in the DHT architecture may be chosen to minimize the total network cost through the use of routing trees generating by a minimum-weight tree algorithm to be described in conjunction with FIGS. 3A–3B. If the cost per unit bandwidth for link i is C; and di is the capacity required on link i to carry the combined primary and restoration traffic for all possible single failure scenarios, then the algorithm generates a DHT architecture that minimizes $$\sum_i C_i d_i.$$

Figure 1B:
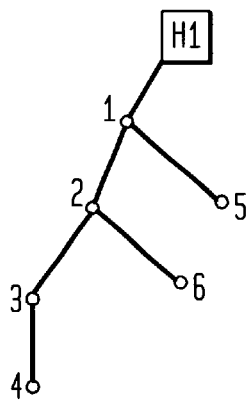
FIGS. 1B and 1C illustrate failure-independent restoration paths for the DHT network architecture of FIG. 1A.
Figure 1C:
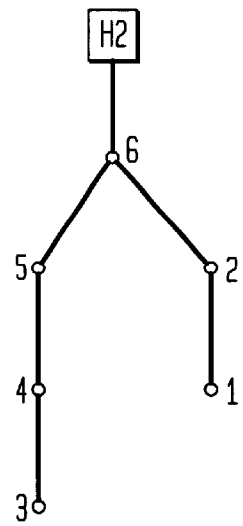

FIGS. 1B and 1C show first and second routing trees, respectively, for the DHT example of FIG. 1A. These routing trees are also referred to herein simply as DHTs. One of the routing trees is rooted at hub node H1, and the other routing tree is rooted at hub node H2. It is clear from FIGS. 1B and 1C that under any single node or link failure, all nodes have a working restoration path available. The DRI complexities of conventional ring-based networks are avoided in the DHT architecture of FIG. 1A by providing a direct path from every node to the second hub node H2. It is assumed for purposes of the present example that the hub nodes H1 and H2 do not need to communicate, as this example is focusing on inter-cluster traffic going out of the FIG. 1A node cluster and not on the intra-cluster traffic. However, the DHT architecture can be modified in a straightforward manner to accommodate intra-cluster traffic as well. For example, as will be described in conjunction with FIGS. 4A and 4B below, the two hub nodes may be made adjacent in both of the routing trees. Intra-cluster traffic could also be handled by conventional intra-ring routing techniques, also without incurring the complications associated with conventional DRI. Preliminary analysis indicates that DHT architectures in accordance with the invention can achieve cost savings on the order of 25%–50% compared to conventional ring-based architectures, in addition to eliminating the operational complexities of DRI.

Figure 2:
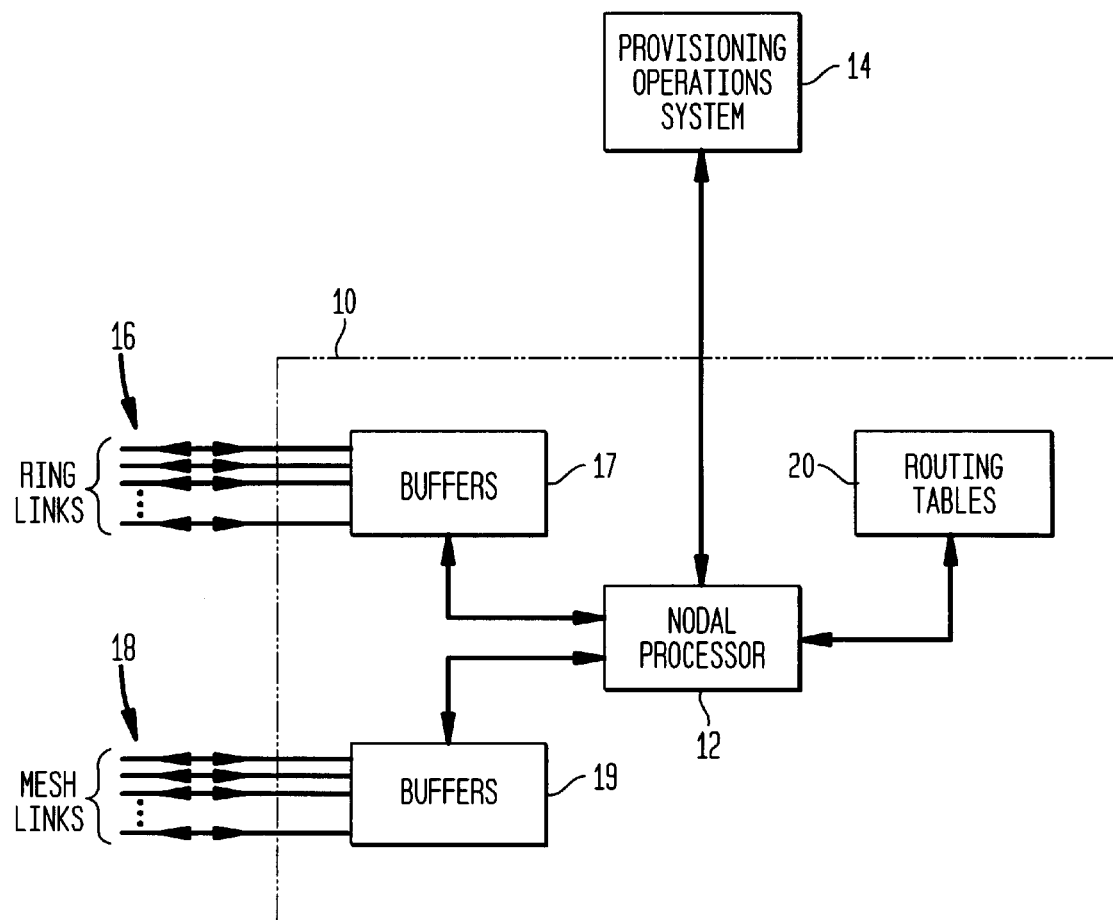
FIG. 2 is a block diagram illustrating an exemplary node in a DHT network in accordance with the invention.

FIG. 2 shows one of the nodes of the DHT network of FIG. 1A in greater detail. The node 10 includes a nodal processor 12 which may include a central processing unit (CPU) with memory. The nodal processor communicates with a provisioning operations system 14, which is illustrative of one type of central controller which may be used to provision routes through the network for routing demands. A set of ring links 16 are connected via buffers 17 to the nodal processor 12. The ring links 16 represent links between the node 10 and other nodes in a given ring structure which includes the node 10. The node 10 further includes a set of mesh links 18 connected via buffers 19 to the nodal processor 12. The mesh links represent links between the node 10 and other nodes of the network which do not share a common ring with node 10. The node 10 supplies signals to and receives signals from other nodes of the network via the ring and mesh links 16, 18. The buffers 17, 19 may be configured to provide optical-to-electrical conversion for signals received on links 16, 18, and electrical-to-optical conversion for signals to be transmitted on links 16, 18.

The node 10 also includes a set of routing tables 20 which specify routing paths through the network for particular demands. The routing tables 20 may be a component of a memory within node 10, and may be combined with or otherwise associated with the internal memory of nodal processor 12. It should be noted that the node 10 of FIG. 2 has been simplified for purposes of illustration, and may include a substantially larger number of components, configured in a conventional manner, as required to support a given application.

Figure 3B:
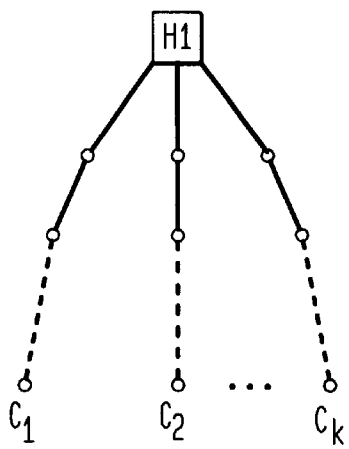
FIGS. 3B and 3C illustrate various aspects of the process of FIG. 3A in greater detail.
Figure 3C:
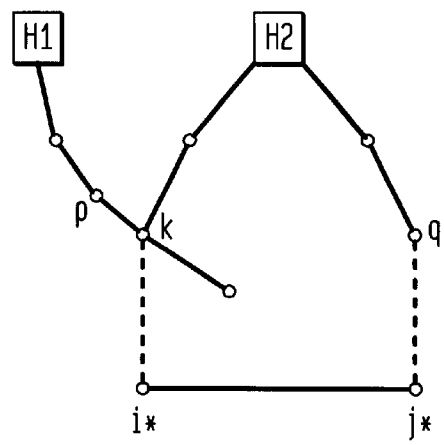
Figure 3A:
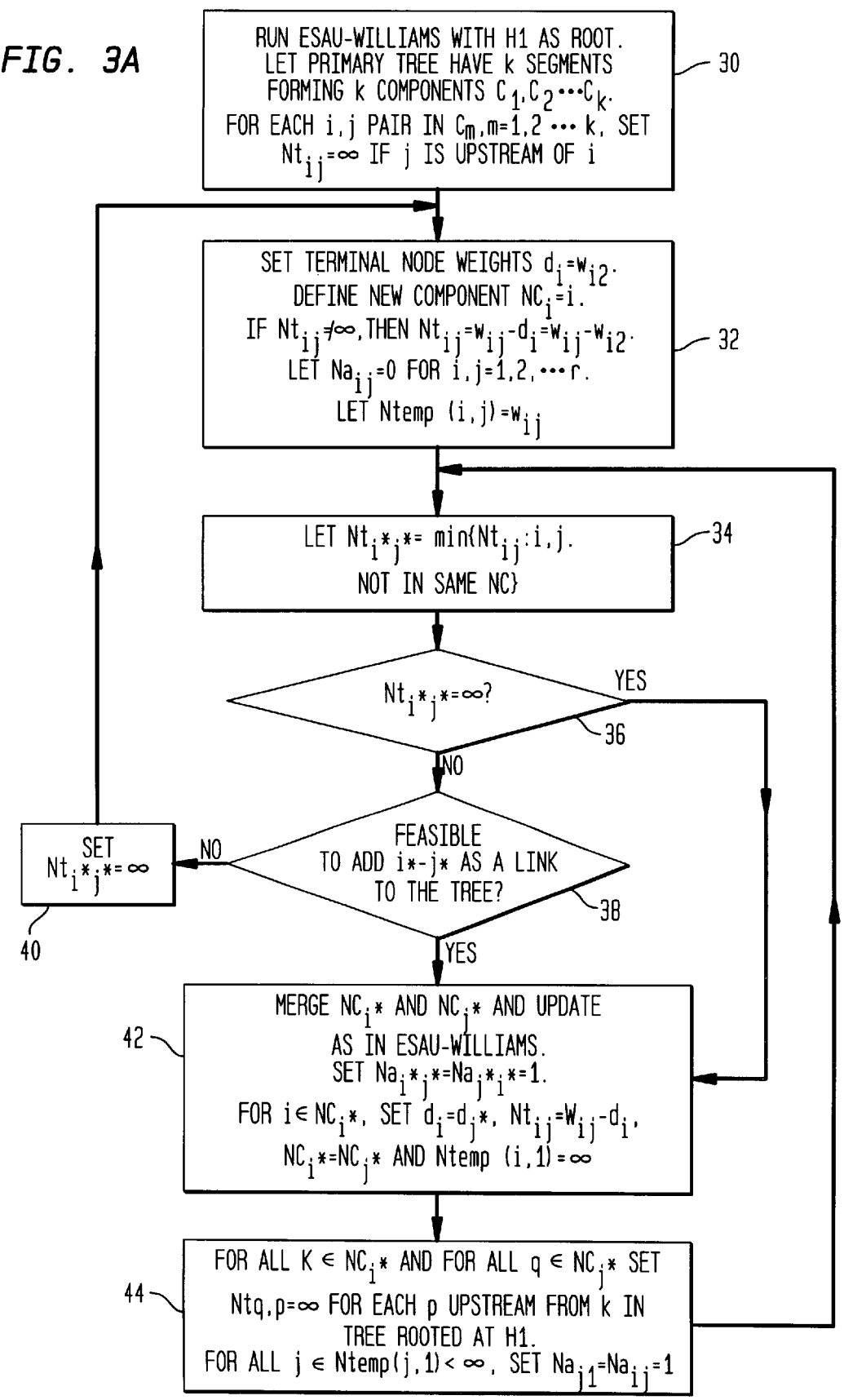
FIG. 3A is a flow diagram illustrating a process for determining minimum-weight routing trees in accordance with the invention.

FIG. 3A is a flow diagram illustrating a process for determining a DHT architecture in accordance with the invention. The process makes use of the well-known Esau-Williams algorithm for determining minimum-weight trees, as described in, for example, L. R. Esau and K. C. Williams, "On Teleprocessing System Design, Part II, A Method for Approximating the Optimal Networks," IBM Systems Journal, 5(3), pp. 142–147, 1966, and A. Kerschenbaum and W. Chou, "A Unified Algorithm for Designing Multidrop Teleprocessing Networks," IEEE Trans. Communications, COM-22 (11), pp. 1762–1772, 1974, both of which are incorporated by reference herein. Like the conventional Esau-Williams algorithm, the process of FIG. 3A begins with a set of nodes N={1, 2, . . . n} and link weights $w_{ij}$ between nodes i and j. The objective of the process is to determine a minimum-weight DHT rooted at hub nodes H1 and H2. This determination may be subject to a user-defined maximum traffic rate constraint:

$$\sum_{i \in segment} m_i \leq M$$

where the $m_i$, are the individual traffic rates at each of the nodes and M is a maximum traffic rate on a given segment, and may also be subject to a user-defined upper bound on the maximum number K of nodes in a given segment.

In step 30 of the FIG. 3A process, the above-noted conventional Esau-Williams algorithm is run with the hub node H1 as the root. Let the primary tree have k segments, such that the algorithm forms k components $c_1, c_2, \ldots C_k$ as shown in FIG. 3B. For each i, j pair in $C_m$, m=1, 2, . . . k, set $Nt_{ij}=\infty$ if j is upstream of i, i.e., if j is closer to the root H1 than i. This is to avoid the use of a link directed from a node a to a node b in both trees of the DHT, such that a failure of this a→b link will not isolate node a. The routing tree "edge" corresponding to a directed link is referred to herein as a directed edge. In step 32, set the terminal node weights $d_i=W_{i2}$ and define a new component $NC_i=i$. If $Nt_{ij}\neq\infty$, then $Nt_{ij}=w_{ij}-d_i=w_{ij}-w_{i2}$. Let $Na_{ij}=0$ for i, j=1, 2, . . . r and let Ntemp(i, j)=$w_{ij}$. In step 34, let $Nt_{i*j*}$ be the minimum $Nt_{ij}$ for which i, j are not in the same component NC. If $Nt_{i*j*}=\infty$ in step 36, skip to step 42. Otherwise, continue with step 38.

In step 38, check the feasibility of adding i*–j* as a link to the tree, in a manner similar to that used in the conventional Esau-Williams algorithm. If it is not feasible to add i*–j* as a link, set $Nt_{i*j*}=\infty$ and return to step 32. If it is feasible to add i*–j* as a link, merge $NC_{i*}$ and $NC_{j*}$ and update the tree, as shown in step 42. The merge and update operations may also be carried out in a manner similar to that used in the conventional Esau-Williams algorithm. Then set $Na_{i*j*}=Na_{j*i*}=1$. For all i ∈ $NC_{j*}$, set $d_i=d_{j*}$, $Nt_{ij}=w_{ij}-d_i$, $NC_i=NC_{j*}$ and Ntemp(i, 1)=∞. In addition, as shown in step 44, for all k ∈ $NC_{i*}$ and for all q ∈ $NC_{j*}$, set $Nt_{qp}=\infty$ for each p that is upstream from k in the tree rooted at H1. This ensures that the paths to H1 and H2 are node disjoint, as illustrated in FIG. 3C. The process then returns to step 34, after setting $Na_{ji}=Na_{ij}=1$ for all j ∈ Ntemp(j, 1)<∞. The process ends when the minimum-weight DHT has been fully determined.

Figure 4A:
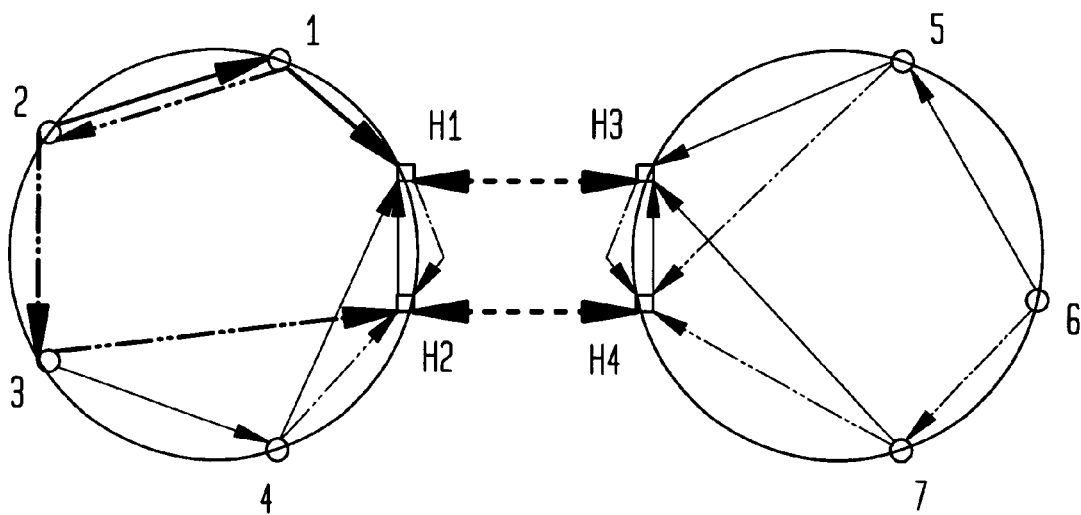
FIGS. 4A and 4B show an example of routing in a DHT network in accordance with the invention.
Figure 4B:
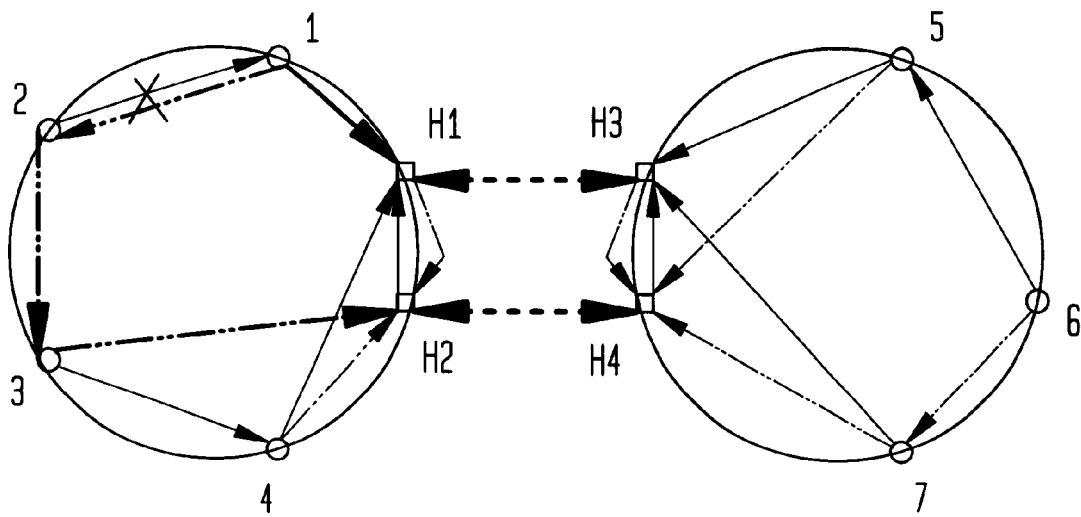

FIGS. 4A and 4B illustrate an example of routing in a DHT network in accordance with the invention. The DHT network in this example includes a first DHT ring with dedicated hub nodes H1 and H2 and four other nodes 1, 2, 3 and 4, and a second DHT ring with dedicated hub nodes H3 and H4 and three other nodes 5, 6 and 7. In accordance with the invention, the DHT rings are used for intra-ring demand routing, and a pair of diverse minimum-weight routing trees within each ring are used for inter-ring demand routing. Each of the routing trees of a given ring is rooted at one of the hub nodes of that ring. As noted above, these pairs of trees are also referred to herein as DHTs. The routing trees are constructed for a given ring such that the two hub nodes of the given ring are adjacent in each of the trees of that ring. The two trees are directed edge disjoint, such that if one edge of a tree is cut, the affected demands can still be routed to the other hub node through the other tree. In the first tree associated with the given ring, there is no edge from the second hub node to any other node except the first hub node, and in the second tree for the given ring, there is no edge from the first hub node to any other node except the second hub node. As previously described, there may be user-defined upper bounds on the total traffic rate and the total number of nodes in any segment of one of the trees. In the example of FIG. 4A, it will be assumed that there is an inter-ring demand from node 2 of the first DHT ring to node 5 of the second DHT ring which requires a total capacity of 4DS3, i.e., four times a standard DS3 capacity. The routing within the first DHT ring is shown in FIG. 4A. In accordance with the invention, a portion α=0.75 of this [2,5] demand, i.e., a capacity of 3DS3, is routed from node 2 to hub node H1 through the first tree of the first DHT ring, as shown by the thick solid arrows. The remaining portion 1−α=0.25 of the [2,5] demand, i.e., a capacity of 1DS3, is routed from node 2 to hub node H2 through the second tree of the first DHT ring, as shown by the thick dashed arrows. The primary capacity on each link along the routing paths is then updated to reflect this routing. It should be noted that when α=1, the first tree of the first DHT ring is referred to as the primary (i.e., service) tree, and the second tree of the first DHT ring is the secondary (i.e., restoration) tree. If a link or node fails in either of the trees associated with the first ring, the affected demand or demands are re-routed to the other hub node through the other tree. The DHT architecture thus provides a failure-independent restoration path for each of the demands routed through one of the trees to one of the hub nodes. FIG. 4B illustrates the re-routing of the above-described [2,5] demand in the event of a failure of the link between nodes 1 and 2 in the first DHT ring. The 3DS3 portion of the [2,5] demand originally routed from node 2 to hub node HI in the first tree of the first DHT ring is re-routed to hub node H2 through the second tree of the first DHT ring, along the path indicated by the thick dashed arrows. The 1DS3 portion of the [2,5] demand from node 2 to hub node H2 through the second tree of the first DHT ring is not affected by the failure of the 2→1 link. The secondary capacity on each link along the re-routing paths is updated to reflect this re-routing. It should be noted that if the link between node 1 and hub node H1 fails, demands previously routed from node 2 to H1 will be re-routed along the path 2→1→2→3→H2.

Figure 5:
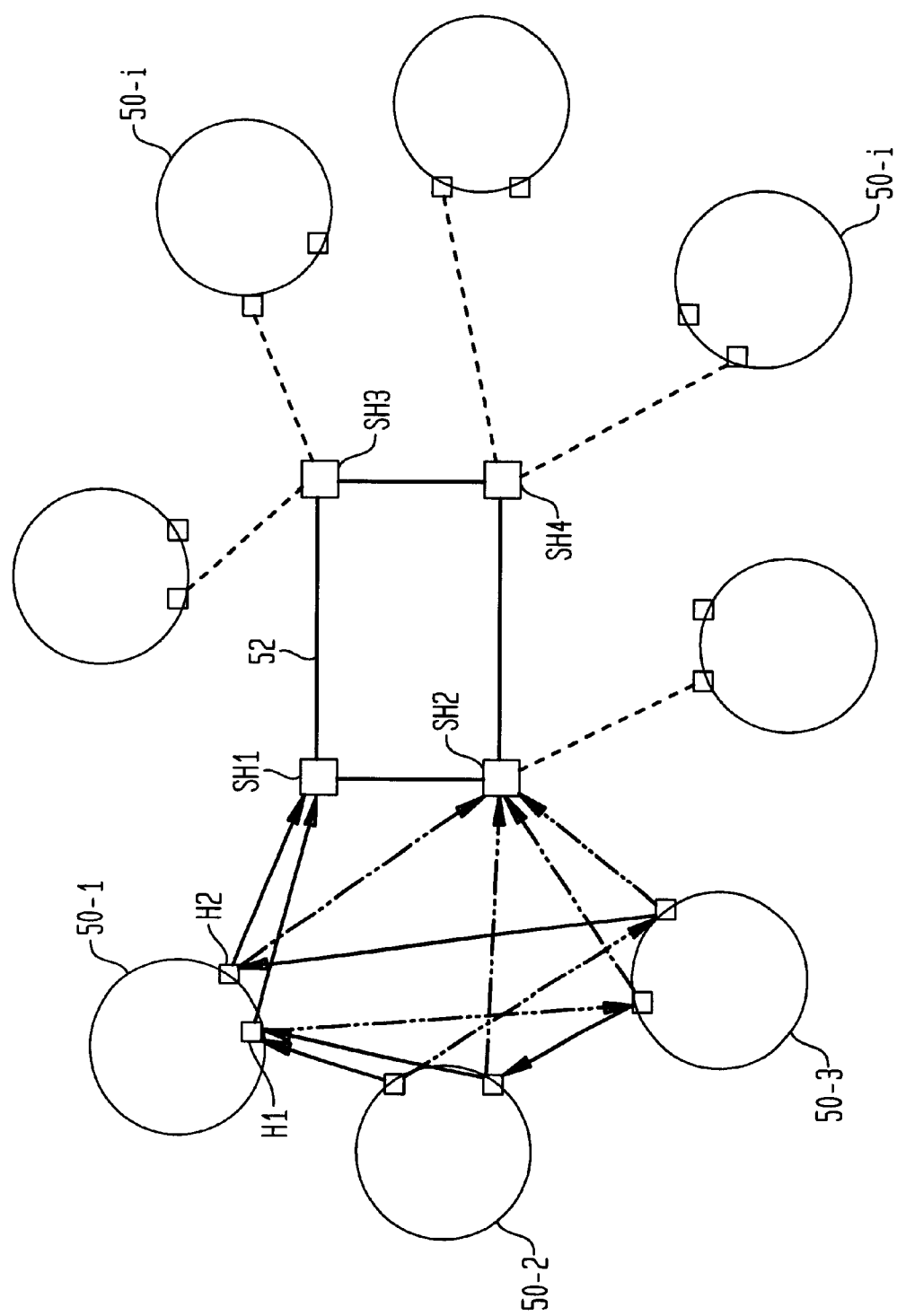
FIG. 5 illustrates a super dual hubbed tree (SDHT) network architecture in accordance with the invention.

FIG. 5 illustrates a super DHT (SDHT) network architecture in accordance with the invention. The SDHT network includes a number of DHT rings 50-i, i=1, 2, . . . R each including a pair of hub nodes H1 and H2. The SDHT network further includes a ring 52 of SDHT nodes SH1, SH2, SH3 and SH4. In accordance with the invention, each pair of hub nodes in one of the DHT rings 50-i is "homed" or coupled to the nearest pair of SDHT nodes. For example, hub nodes H1 and H2 of DHT ring 50-1 are coupled to the pair of SDHT nodes SH1 and SH2. Similarly, the pairs of hub nodes of DHT rings 50-2 and 50-3 are also coupled to the pair of SDHT nodes SH1 and SH2. A pair of diverse routing trees are constructed for each pair of SDHT nodes using the hub nodes connected thereto as the nodes of the trees. These routing trees are also referred to herein simply as SDHTs. Traffic demands between one of the hub nodes of a DHT ring and a given pair of the SDHT nodes is routed on one of the trees constructed for the given pair of SDHT nodes. Traffic demands between the SDHT nodes are routed on the SDHT ring 52. The pair of diverse routing trees for a given pair of SDHT nodes can be constructed in the manner described in conjunction with FIG. 3A above.

Figure 6:
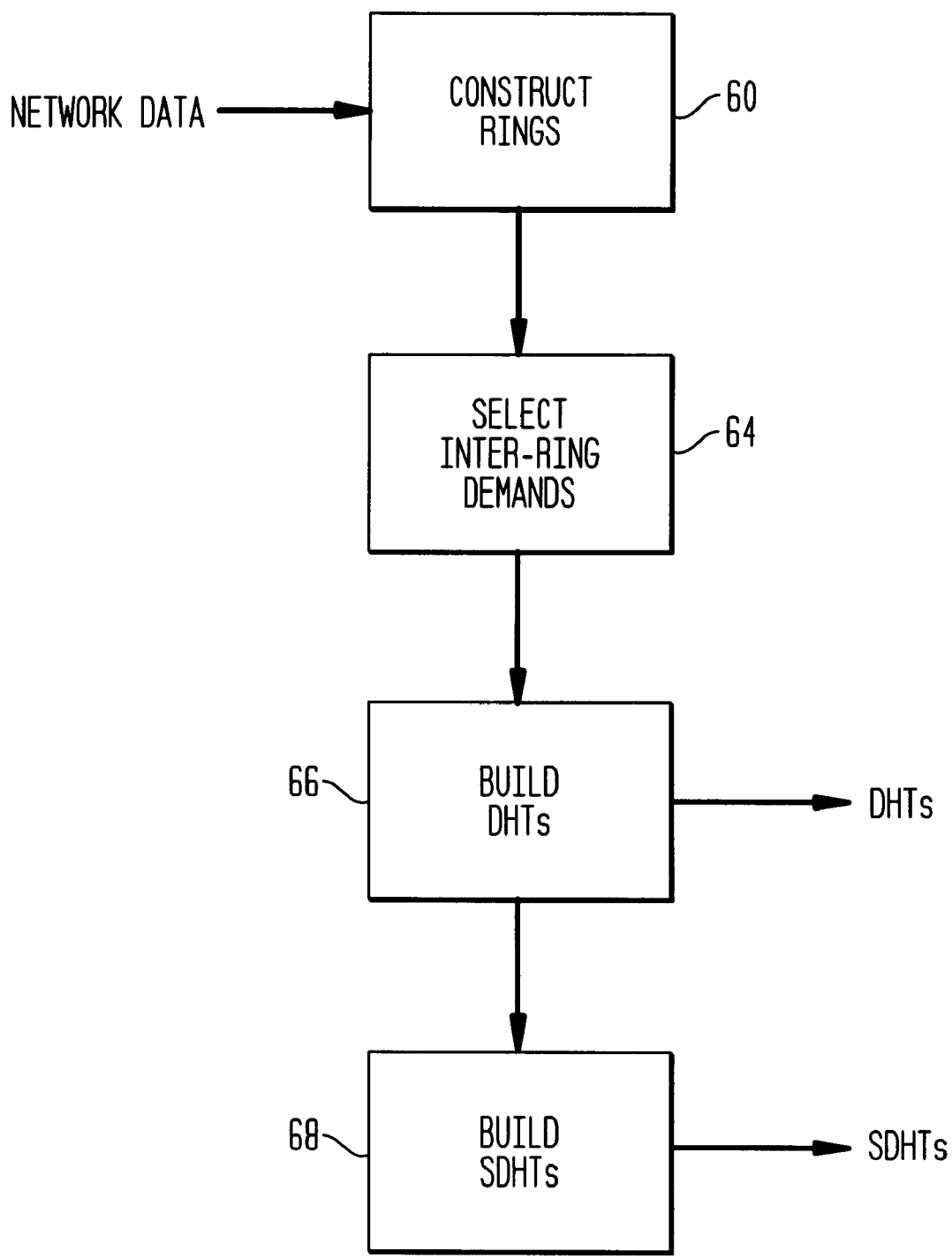
FIG. 6 is a flow diagram illustrating a process for configuring a DHT or SDHT network architecture in accordance with the invention.

FIG. 6 is a flow diagram illustrating a process for configuring a DHT or SDHT network architecture in accordance with the invention. In step 60, a number of rings are constructed to represent a network of interconnected nodes. Input to step 60 includes network data such as demands, nodes, links, etc. Step 64 uses the rings constructed in step 60 to select inter-ring demands. In step 66, DHTs are constructed in the manner described in conjunction with FIG. 3A. The resulting DHTs are further processed in step 68 to build SDHTs such as those shown in FIG. 5. The DHTs and SDHTs are used to provide primary and restoration paths for each of a number of demands in the manner previously described. Step 68 may be eliminated in applications in which the network utilizes only DHT rings.

The above-described embodiments of the invention are intended to be illustrative only. For example, the DHT and SDHT network architectures shown are simplified for clarity of illustration, and the techniques of the invention could be used to generate many alternative network configurations. In addition, although the invention is well suited for ring-based networks, it may be applied in applications in which clusters of nodes incorporate more complex interconnections, such as those shown in the interconnected node cluster of FIG. 1A. Moreover, any of a number of alternative techniques could be used to determine suitable pairs of routing trees for use in conjunction with the DHT and SDHT architectures, and the routing trees need not be minimum-weight trees. The tree determination and other aspects of the demand routing process may be performed within a central provisioning operations system such as system 14 of FIG. 2 or in another other type of central controller associated with the network, or within a hub node or other node of a given ring, or in a hybrid centralized/distributed manner in which various aspects of the routing are performed in a central controller while other aspects are performed locally at the nodes. These and numerous other alternative embodiments within the scope of the following claims will be apparent to those skilled in the art.

what is claimed is:

1. A method of routing capacity demands in a network including at least one ring having a pair of hub nodes and a plurality of additional nodes, the method comprising the steps of:

determining a pair of routing trees for the ring, each of the routing trees specifying paths between at least a subset of the nodes of the ring, wherein each of the routing trees in the pair of trees for the ring has as its root a corresponding one of the pair of hub nodes of the ring; and utilizing the pair of routing trees to route demands for capacity from the ring to another portion of the network, wherein the routing trees for the ring are directed edge disjoints such that if a link corresponding to one edge of a tree fails, an affected demand is routed to the other hub node of the ring using the other routing tree of the ring.

2. The method of claim 1 wherein the determining step includes determining a pair of minimum-weight routing trees for each of a plurality of rings in the network.

3. The method of claim 1 wherein the pair of routing trees for the ring are configured such that the two hub nodes of the ring are adjacent in each of the routing trees of that ring.

4. A method of routing capacity demands in a network including at least one ring having a pair of hub nodes and a plurality of additional nodes, the method comprising the steps of:

determining a pair of routing trees for the ring, each of the routing trees specifying paths between at least a subset of the nodes of the ring, wherein each of the routing trees in the pair of trees for the ring has as its root a corresponding one of the pair of hub nodes of the ring; and utilizing the pair of routing trees to route demands for capacity from the ring to another portion of the network, wherein a first tree of the pair of trees for the ring does not include an edge from a second hub node of the ring to any node other than a first hub node of the ring, and a second tree of the pair of trees for the ring does not include an edge from the first hub node to any node other than the second hub node.

5. The method of claim 1 wherein if a link or node fails in either of the routing trees associated with the ring, an affected demand is re-routed to the other hub node of the ring through the other routing tree of the ring.

6. A method of routing capacity demands in a network including at least one ring having a pair of hub nodes and a plurality of additional nodes, the method comprising the steps of:

determining a pair of routing trees for the ring, each of the routing trees specifying paths between at least a subset of the nodes of the ring, wherein each of the routing trees in the pair of trees for the ring has as its root a corresponding one of the pair of hub nodes of the ring; and utilizing the pair of routing trees to route demands for capacity from the ring to another portion of the network, wherein a given demand originating at one of the additional nodes of the ring is routed through a first routing tree of the ring to a first hub node of the ring, and a restoration path for the given demand is provided through a second routing tree of the ring to a second hub node of the ring.

7. A method of routing capacity demands in a network including at least one ring having a pair of hub nodes and a plurality of additional nodes, the method comprising the steps of:

determining a pair of routing trees for the ring, each of the routing trees specifying paths between at least a subset of the nodes of the ring, wherein each of the routing trees in the pair of trees for the ring has as its root a corresponding one of the pair of hub nodes of the ring; and utilizing the pair of routing trees to route demands for capacity from the ring to another portion of the network, wherein a portion a of a given demand is routed from one of the additional nodes of the ring to a first hub node of the ring through the first routing tree of the ring, and a remaining portion 1-$\alpha$ of the demand is routed from the one additional node to a second hub node of the ring through a second routing tree of the ring.

8. The method of claim 1 further including the steps of:

assigning hub nodes of rings in the network to a pair of super hub nodes in the network;

determining a pair of routing trees for the pair of super hub nodes; and utilizing the pair of routing trees for the pair of super hub nodes to route demands for capacity from one of the hub nodes to the pair of super hub nodes.

9. An apparatus for use in a communication network including at least one ring having a pair of hub nodes and a plurality of additional nodes, the apparatus comprising:

a processor operative to determine a pair of routing trees for the ring, each of the routing trees specifying paths between at least a subset of the nodes of the ring, such that each of the routing trees in the pair of trees for the ring has as its root a corresponding one of the pair of hub nodes of the ring, wherein the pair of routing trees is utilized to route demands for capacity from the ring to another portion of the network, and wherein the routing trees for the ring are directed edge disjoint, such that if a link corresponding to one edge of a tree fails, an affected demand is routed to the other hub node of the ring using the other routing tree of the ring.

10. The apparatus of claim 9 wherein the processor is a central controller associated with multiple nodes of the network.

11. The apparatus of claim 9 wherein the processor is a nodal processor associated with a particular one of the nodes of the network.

12. The apparatus of claim 9 wherein the processor is further operative to determine a pair of minimum-weight routing trees for each of a plurality of rings in the network.

13. The apparatus of claim 9 wherein the routing trees for the ring are configured such that the two hub nodes of the ring are adjacent in each of the routing trees of the ring.

14. The apparatus of claim 9 wherein the network further includes a plurality of pairs of super hub nodes, and pairs of the hub nodes of rings in the network are each assigned to pairs of the super hub nodes, and further wherein a pair of routing trees for a given pair of the super hub nodes is utilized to route demands for capacity from one of the hub nodes to the given pair of super hub nodes.

15. An apparatus for use in a communication network including at least one ring having a pair of hub nodes and a plurality of additional nodes, the apparatus comprising:

a processor operative to determine a pair of routing trees for the ring, each of the routing trees specifying paths between at least a subset of the nodes of the ring, such that each of the routing trees in the pair of trees for the ring has as its root a corresponding one of the pair of hub nodes of the ring, wherein the pair of routing trees is utilized to route demands for capacity from the ring to another portion of the network, and wherein a first tree of the pair of trees for the ring does not include an edge from a second hub node of the ring to any node other than a first hub node of the ring, and a second tree of the pair of trees for the ring does not include an edge from the first hub node to any node other than the second hub.

16. The apparatus of claim 9 wherein if a link or node fails in either of the routing trees associated with the ring, an affected demand is re-routed to the other hub node of the ring through the other routing tree of the ring.

17. An apparatus for use in a communication network including at least one ring having a pair of hub nodes and a plurality of additional nodes, the apparatus comprising:

a processor operative to determine a pair of routing trees for the ring, each of the routing trees specifying paths between at least a subset of the nodes of the ring, such that each of the routing trees in the pair of trees for the ring has as its root a corresponding one of the pair of hub nodes of the ring, wherein the pair of routing trees is utilized to route demands for capacity from the ring to another portion of the network, and wherein a given demand originating at one of the additional nodes of the ring is routed through a first routing tree of the ring to a first hub node of the ring, and a restoration path for the given demand is provided through a second routing tree of the ring to a second hub node of the ring.

18. An apparatus for use in a communication network including at least one ring having a pair of hub nodes and a plurality of additional nodes, the apparatus comprising:

a processor operative to determine a pair of routing trees for the ring, each of the routing trees specifying paths between at least a subset of the nodes of the ring, such that each of the routing trees in the pair of trees for the ring has as its root a corresponding one of the pair of hub nodes of the ring, and wherein the pair of routing trees is utilized to route demands for capacity from the ring to another portion of the network, wherein a portion $\alpha$ of a given demand is routed from one of the additional nodes of the ring to a first hub node of the ring through the first routing tree of the ring, and a remaining portion $1-\alpha$ of the demand is routed from the one additional node to a second hub node of the ring through a second routing tree of the ring.

19. A communication network comprising:

at least one ring including a pair of hub nodes and a plurality of additional nodes;

wherein a pair of routing trees is generated for the ring, each of the pair of routing trees specifying paths between at least a subset of the nodes of the ring, such that each of the routing trees in the pair of trees for the ring has as its root a corresponding one of the pair of hub nodes of the given ring, wherein the pair of routing trees is utilized to route demands for capacity from the given ring to another portion of the network, and wherein the routing trees for the ring are directed edge disjoint, such that if a link corresponding to one edge of a tree fails, an affected demand is routed to the other hub node of the ring using the other routing tree of the ring.

20. The apparatus of claim 19 wherein the network further includes a plurality of pairs of super hub nodes, and pairs of the hub nodes of rings in the network are each assigned to pairs of the super hub nodes, and further wherein a pair of routing trees for a given pair of the super hub nodes is utilized to route demands for capacity from one of the hub nodes to the given pair of super hub nodes.

21. A communication network comprising:

at least one non-dual ring interworking (non-DRI) ring including a pair of hub nodes and a plurality of additional nodes;

wherein a pair of routing trees is generated for the non-DRI ring, each of the routing trees specifying paths between at least a subset of the nodes of the non-DRI ring, and wherein the pair of routing trees is utilized to route demands for capacity from the non-DRI ring to other portions of the network, wherein each of the routing trees in the pair of routing trees for the ring has as its root a corresponding one of the pair of hub nodes of the non-DRI ring, and wherein the routing trees for the ring are directed edge disjoint, such that if a link corresponding to one edge of a tree fails, an affected demand is routed to the other hub node of the ring using the other routing tree of the ring.

* * * * *